United States Patent
Jadhav (10) Patent No.: US 11,689,602 B2
(45) Date of Patent: Jun. 27, 2023

(54) OBJECT TRANSFORMATIONS AND THE PERSISTENCE OF ALL STATES DURING THE TRANSFORMATION LIFECYCLE

(71) Applicant: Ajay Jadhav, New York, NY (US)

(72) Inventor: Ajay Jadhav, New York, NY (US)

( * ) Notice: Subject to any disclaimer, the term of this patent is extended or adjusted under 35 U.S.C. 154(b) by 495 days.

(21) Appl. No.: 14/775,926

(22) PCT Filed: Mar. 14, 2014

(86) PCT No.: PCT/US2014/028717
§ 371 (c)(1),
(2) Date: Sep. 14, 2015

(87) PCT Pub. No.: WO2014/144351
PCT Pub. Date: Sep. 18, 2014

(65) Prior Publication Data
US 2016/0036888 A1    Feb. 4, 2016

Related U.S. Application Data

(60) Provisional application No. 61/790,375, filed on Mar. 15, 2013.

(51) Int. Cl.
*A63F 13/63* (2014.01)
*A63F 13/655* (2014.01)
(Continued)

(52) U.S. Cl.
CPC ............ *H04L 67/02* (2013.01); *A63F 13/355* (2014.09); *A63F 13/63* (2014.09); *A63F 13/655* (2014.09);
(Continued)

(58) Field of Classification Search
CPC ..... G06F 3/0486; G06F 3/0482; H04L 67/02; H04L 67/42; H04L 67/01; A63F 13/355; A63F 13/63; A63F 13/655
See application file for complete search history.

(56) References Cited

U.S. PATENT DOCUMENTS 5,835,919 A  * 11/1998  Stern ..................... G06F 3/0481
                                                                    715/209
5,890,176 A  *  3/1999  Kish ................... G06F 9/44521
                                                                    715/205

(Continued)

OTHER PUBLICATIONS

International Preliminary Report on Patentability dated Sep. 24, 2015, in related International Patent Application No. PCT/US2014/028717.

(Continued)

*Primary Examiner* — Kieu D Vu
*Assistant Examiner* — Blaine T Basom
(74) *Attorney, Agent, or Firm* — Wiley Rein LLP (57) ABSTRACT

A system for object transformations and persistence of all states during a transformation lifecycle includes a user interface for receiving or creating a data object, a first application capable of processing and transmitting attributes of a data object, a server capable of receiving, persisting or distributing these attributes, a second application capable of receiving and processing these attributes to create or recreate a data object, a user interface for displaying the created or recreated data object, wherein the first and second applications of the system may be the same, may reside on the same device or platform, or may reside on different devices or platforms.

8 Claims, 7 Drawing Sheets

(51) Int. Cl.
*G06F 3/0486* (2013.01)
*H04L 67/02* (2022.01)
*A63F 13/355* (2014.01)
*H04L 67/01* (2022.01)
*G06F 3/0482* (2013.01)

(52) U.S. Cl.
CPC .......... *G06F 3/0482* (2013.01); *G06F 3/0486* (2013.01); *H04L 67/01* (2022.05)

(56) References Cited

U.S. PATENT DOCUMENTS

| | | | | |
|---|---|---|---|---|
| 7,269,800 | B2* | 9/2007 | Manolis | H04N 1/217 715/838 |
| 8,195,762 | B2* | 6/2012 | Riggs | G06F 17/30876 709/207 |
| 8,612,515 | B2 | 12/2013 | Wood et al. | |
| 8,628,087 | B2* | 1/2014 | Knowlton | A63F 9/10 273/153 R |
| 2002/0152457 | A1* | 10/2002 | Jahnke | G06F 8/437 717/139 |
| 2003/0131347 | A1* | 7/2003 | Allison | G06F 9/449 717/165 |
| 2004/0205644 | A1* | 10/2004 | Shaughnessy | G06F 17/24 715/255 |
| 2009/0164500 | A1* | 6/2009 | Mathur | G06F 17/2247 |
| 2010/0115036 | A1* | 5/2010 | Rosner | G06F 17/30058 709/206 |
| 2012/0094768 | A1* | 4/2012 | McCaddon | H04N 21/8545 463/42 |
| 2013/0151940 | A1* | 6/2013 | Bailor | G06F 17/24 715/229 |
| 2013/0235074 | A1* | 9/2013 | Cherna | G06T 11/60 345/619 |

OTHER PUBLICATIONS

International Search Report and Written Opinion dated Aug. 21, 2014, in related International Patent Application No. PCT/US2014/028717.

* cited by examiner

OBJECT TRANSFORMATIONS AND THE PERSISTENCE OF ALL STATES DURING THE TRANSFORMATION LIFECYCLE

RELATED APPLICATION

This application claims priority benefit from U.S. patent application No. 61/790,375, filed Mar. 15, 2013, and incorporated fully herein by reference.

FIELD OF THE INVENTION

The invention relates to object transformations and the persistence of all states during a transformation lifecycle.

BACKGROUND OF THE INVENTION

Jigsaw puzzles and collages have been a part of gaming history for decades. Various systems, methods and applications have allowed users to interact with their computing devices to solve scrambled jigsaw puzzles, to create, edit and maintain collages, and to play computerized games. There has not been a process, however, wherein a user is able to interact with the digital object represented by graphical shapes through a graphical user interface per the functionality coded within the application.

SUMMARY OF THE INVENTION

The foregoing needs are met, to a great extent, by the embodiments described herein, wherein in one aspect a technique and apparatus are provided for object transformations and the persistence of all states during the transformation lifecycle.

In accordance with one embodiment, a system for object transformations and persistence of all states during a transformation lifecycle includes a user interface for receiving or creating a data object, a first application capable of processing and transmitting attributes of a data object, a server capable of receiving, persisting or distributing these attributes, a second application capable of receiving and processing these attributes to create or recreate a data object, a user interface for displaying the created or recreated data object, wherein the first and second applications of the system may be the same, may reside on the same device or platform, or may reside on different devices or platforms.

In accordance with one embodiment, a system and process for object transformations and persistence of all states during a transformation lifecycle includes uploading a media object via a browser to a backend server by using a drag and drop method or by choosing an object from the file system listing dialog box or any other method. The system and process further includes providing with the browser the functionality to interpret most of the object types, handing over the object to the application, and maintaining, with the application logic and maintaining a built-in intelligent routine that separates between various types of data elements of the data object.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

Embodiments of the invention will now be described with reference to the drawing figures, in which like reference numerals refer to like parts throughout. Embodiments of the invention advantageously provide for object transformations and the persistence of all states during a transformation lifecycle.

All patents and other publications identified are expressly incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents are based on the information available to the applicants and does not constitute any admission as to the correctness of the dates or contents of these documents.

As used herein and in the claims, the singular forms include the plural reference and vice versa unless the context clearly indicates otherwise; the term "or" is inclusive unless modified, for example, by "either." Other than in the operating examples, or where otherwise indicated, all numbers expressing quantities of ingredients or reaction conditions used herein should be understood as modified in all instances by the term "about."

Unless otherwise defined, scientific and technical terms used in connection with the formulations described herein shall have the meanings that are commonly understood by those of ordinary skill in the art. The terminology used herein is for the purpose of describing particular embodiments only, and is not intended to limit the scope of the present invention, which is defined solely by the claims.

Systems and method for efficiently splitting up or breaking down a data object into distinct sub or super data objects, while continuously persisting each and every state of each and every sub and super data object throughout the process lifecycle of transformations, conversions or mutations. Transformations, conversions or mutations are achieved by applying distinct or some operations to these sub or super objects, or alternatively, assembling the split-up sub- or super-objects into one single object that constitutes either the original object or an altogether different object.

PCT US2013/027584 describes the process wherein a user interacts with an application within a browser or a native interface on a computing device of any kind and is able to create graphical shapes on a rendering surface that transforms the graphical object to represent some kind of human interaction or activity. This solution describes the process that the application invokes to interact and apply the desired transforms to the data object, which then has the ability to invoke self-embedded functions to bring about the transformation within themselves to correspond to the invoked function. This depiction or display of the transformed shape onto a graphical rendering surface occurs through an audio response or through some other sensory mechanism.

Jigsaw puzzles and collages have been a part of gaming history for decades. Various systems, methods and applications have allowed users to interact with their computing devices to solve scrambled jigsaw puzzles, to create, edit and maintain collages, and to play computerized games. This application creates a process wherein a user is able to interact with the digital object represented by graphical shapes through a graphical user interface per the functionality coded within the application. The functionality, among other things, could entail importing objects into the browser.

An example would be uploading a media object via the browser to a backend server by using a drag and drop method or by choosing an object from the file system listing dialog box or any other method. The browser would then provide the functionality to interpret most of the object types and would hand-over the object to the application. The application's logic takes over from there and maintains a built-in intelligent routine that separates between various types of data elements of the data object. The routine takes smaller, easier to manage data elements, and then, as described in U.S. patent application Ser. No. 13/565,171, filed Aug. 2, 2012, extracts various data elements and stores them in the local database cache component while syncing the same on the server side counterpart—a Cloud distributed file system and a structured or unstructured database.

Figure 1:
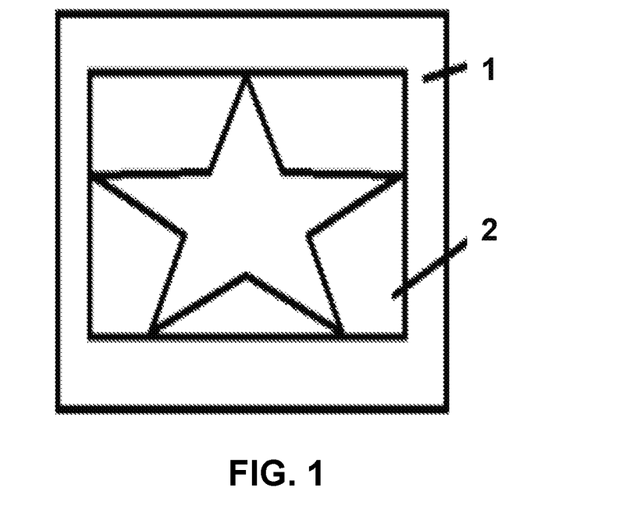
FIG. 1 depicts a full image of an embodiment of the invention.
Figure 2:
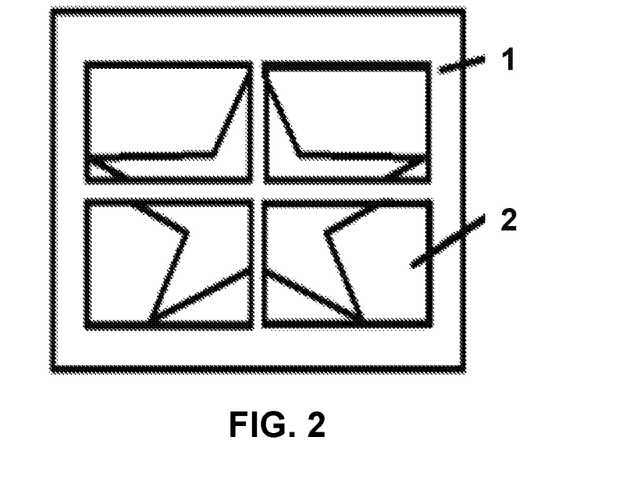
FIG. 2 depicts the separating of the images in accordance with an embodiment of the invention.
Figure 3:
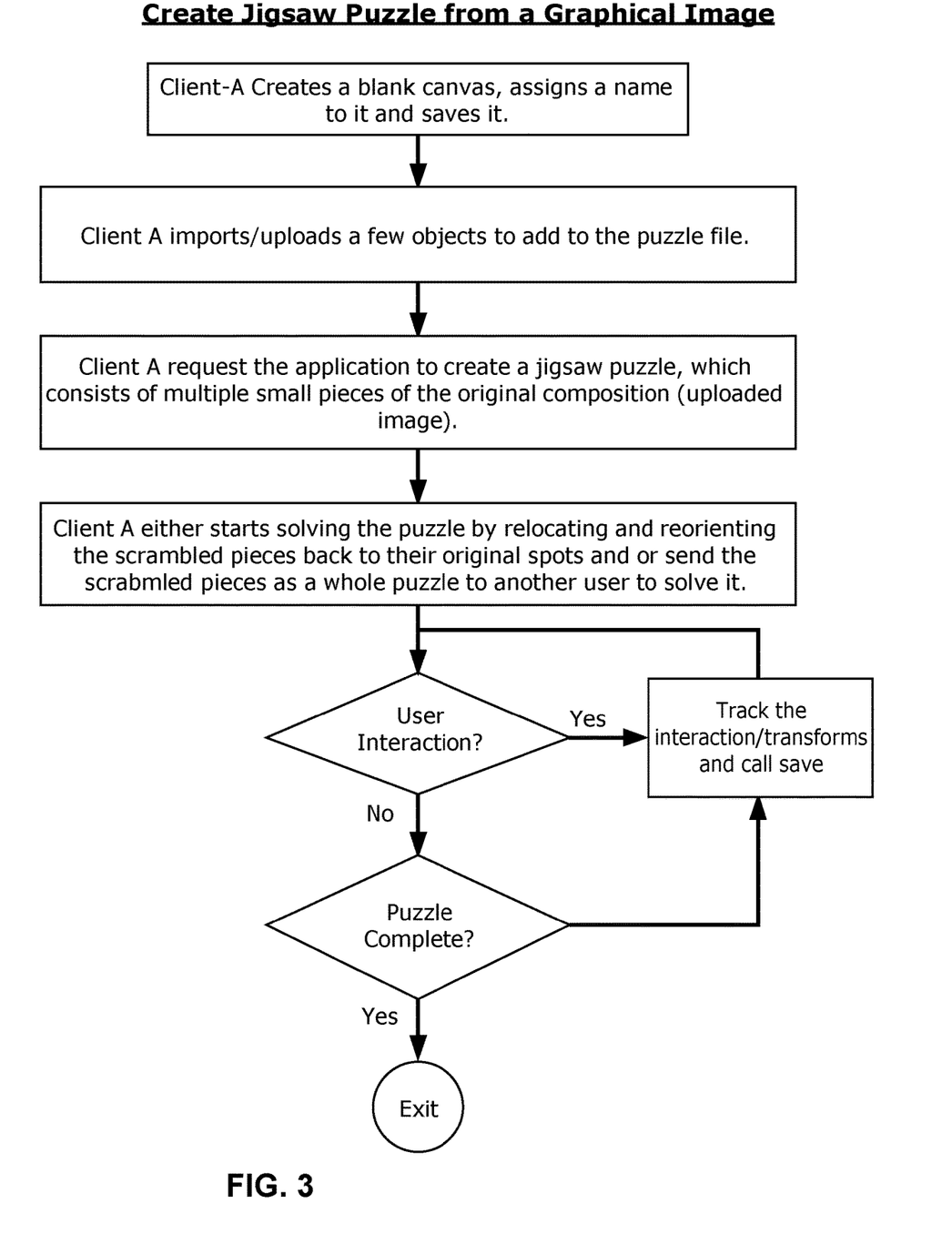
FIG. 3 is a diagram of the methodology of how to retain and access the image location data in accordance with an embodiment of the invention.

Other computer applications have been able to scramble and manipulate jpegs, images, files, etc.; the embodiments herein are novel, however, by providing function to disassemble and retain the original data elements together with the transforms of the graphical objects and those of a CANVAS all within a browser or a graphical rendering interface on a local client cache. The embodiments herein provide for manipulating any type of data object (2) including graphical shapes and their underlying database objects in a browser (1) is unique. See FIG. 1. Examples would include breaking-up an image into separate smaller images, applying various kinds of visual or other filters, or changing the object orientation, while still retaining the location and placement of each separate piece, thereby creating new images along with their corresponding graphical data objects (2) and their digital representation in the form of data objects. See FIG. 2. The application would create these new variations in the client cache component with a simultaneous sync to the backend system, as described in U.S. patent application Ser. No. 13/565,171. This can be an efficient way to create a jigsaw puzzle with a variable number of pieces out of any image within the browser (1) or any other rendering surface; storing each new and unique image of the jigsaw puzzle as a separate graphical object with its digital representation in the form of underlying data object. See FIG. 3.

Embodiments can also apply the transform to all or selected manipulated images as they may relate to various gaming products. Because this aspect of the application tracks each and every state of the data object and their underlying data object, the application retains the ability to restore any state of a selected graphical shape or the whole canvas to a desired state in the series of transforms. This retention capability can be applied to the graphical shapes and their underlying data objects of other business related functionality such as: creating hierarchical tree structures, organizational charts, graphical project and task management applications, mind maps, flow charts; rendering music albums; creating collages; collapsing a collage; viewing of photo collections in varied layouts such as, photo album or a slide show; and displaying a grid of media collections that include audio (including playlists), video, books, magazines, etc.

The methodology to break-up larger graphical shapes and their underlying data objects into smaller objects or even into new data objects in their entirety, is based on trying to find a better way to store, manipulate, transform, and share smaller bits of information. This enables our application to create various collage images with different filters down to the pixel level. Currently, this is virtually impossible to achieve with objects with large memory footprints since the browsers in most mobile devices are pretty lightweight and the Canvas/scalable vector graphics and other rendering elements are incapable of storing and manipulating objects with large footprints as they have very limited processing capability and no memory of their own.

In some embodiments, the application makes use of functions embedded within the data objects, as described in PCT US2014/28230, in the case of graphical objects include transformations, conversions or mutations, amongst others. It also makes use of embedded objects when these graphical shapes are used with a social networking user interface. An example would be the sharing of a collage data object with embedded objects that constitute graphical images, audio, video and other elements along with background shapes. Each of the data objects, in turn, may contain transforms as functional data elements that are specific to each data object individually—a comment panel that is attached to each and every object in the collection, which can be empty or populated with embedded objects representing individual comments that may, in turn, contain text and pictures of the poster. The comments can have types associated with it as embedded objects that describe the nature of the comment, good/bad, like/dislike, etc. As illustrated here, in some embodiments the application is capable of extending this hierarchy of embedded objects without limitation while maintaining persistence using the collaboration server through the process described in PCT US2014/28230. Users can share any and all of these objects in a social networking setup through our object graph storing and retrieval process as described in PCT US2014/28230, which tracks and retains each and every data object throughout its life cycle.

An additional illustration of this concept would entail creating a jigsaw puzzle from an image downloaded from the Internet. See FIGS. 5A and 5B. Smaller data objects would persist in our proprietary database and on the client side, while their original data elements, such as location, filter, orientation, etc., are also retained for the option of bringing the smaller images back together in the same exact original location if needed. The original coordinates for historical and future reference is tracked and retained in a database infrastructure in perpetuity, requiring only a minimal footprint on the user's local device, as described in U.S. patent application Ser. No. 13/565,171. The original images are retained in their normal form, but then are filtered and stored in our proprietary database. The filters are also stored as they relate to the original image in the proprietary database or in a distributed file system. The application can also apply these filters in creating the compositions based on the age of the recipient user the original image could be divided/split into a number of puzzle pieces related to the skills associated with the age of the recipient (the older the recipient, the more pieces of the puzzle). The end result is a graphical composition that is stored individually or as a group in a standard image format such as, JPEG, GIF, PNG, etc., making the object lightweight for sharing. Should the user ever desire the details of the image for commenting, editing or reversing a transform, the associated detailed object graph is retrieved from the database and displayed as desired on the Canvas or any other graphical rendering interface. Each larger or smaller image can be manipulated and moved to meet the needs of any user or application. The manipulations can be used or accessed across multiple devices and platforms by users concurrently. Based on the platform agnostic modular framework patent application, PCT US2013/059160, interactive collaboration of images can occur in the same manner in real-time for all authorized recipients of the image. For example, one user can create a collage of pictures and allow access by other users. The other users, in turn, can change or alter the collage concurrently, yet the original collage is maintained in its original form on the database and can be recalled easily. This process can be extended to any type of object that the device's native Operating System can handle.

Figure 4:
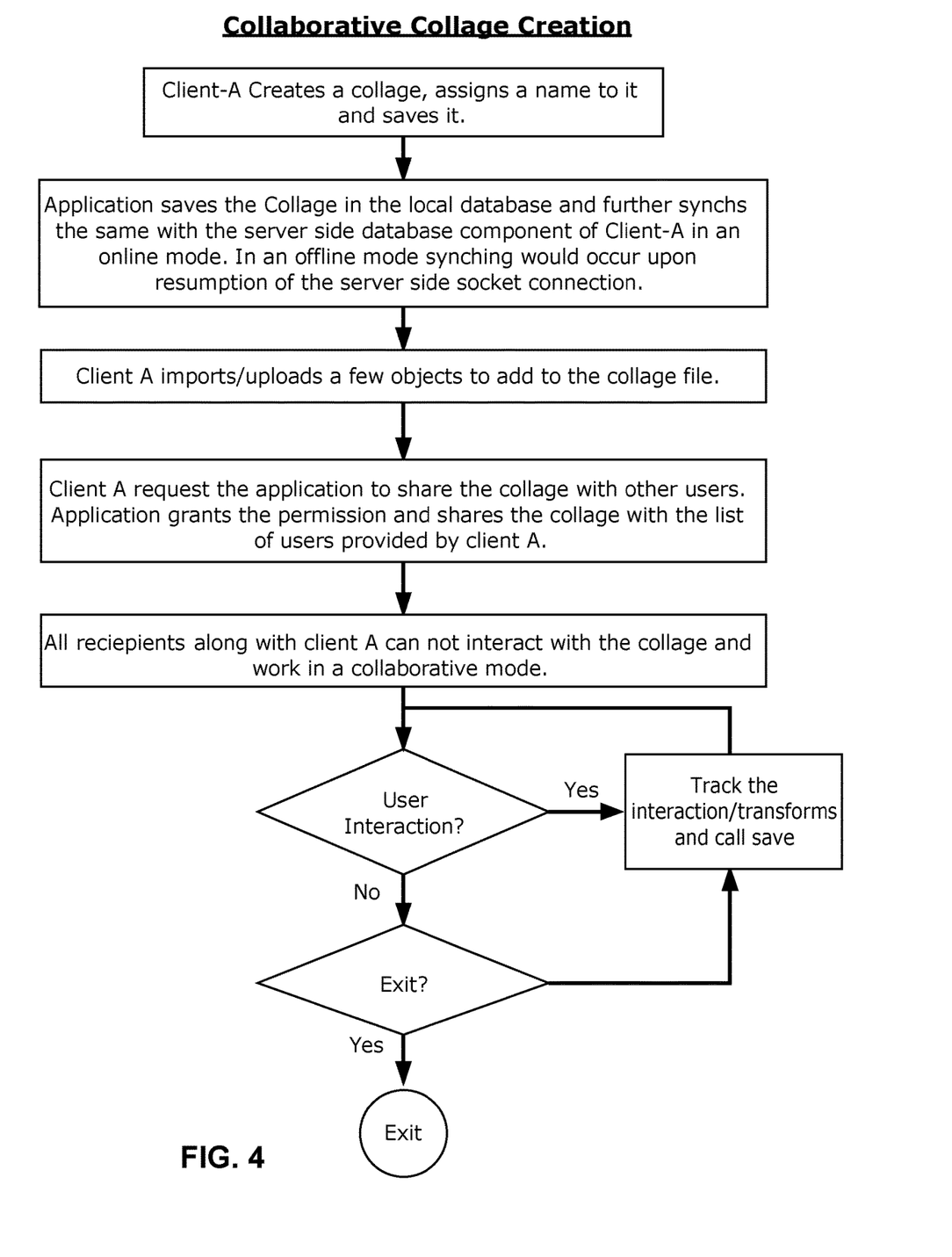
FIG. 4 is a diagram of the methodology of how to create, share and edit a collage in a collaborative manner in accordance with an embodiment of the invention.

Using the self-timer data element of the data object, this application has the ability to self-create compositions, such as a collage or a puzzle. An example would be for the system to create a collage based on a user's birthday, graduation, wedding, etc., and to distribute said self-created collage to various contacts from a user's contact list. The authorized recipients can add/edit/compose images/items to the collage in a collaborative fashion as described in FIG. 4 and then have the finished composition delivered to the original user. In essence, this scenario showcases the functionality of our application to self-create collages from the user's own photo collection together with contributions from designated or selected contacts based upon a specific social or private event.

In order to share the creation, edits and updates of the collage, the application makes use of the socket interface or the http connection to the server as described in U.S. patent application Ser. No. 13/565,171. This allows for an efficient and fast rendering of the image, particularly in cases of heavy graphical composition with complicated object graphs. See FIGS. 5A-5B for an additional embodiment.

The application also can embed objects of different types inside of one another. The objects distinguish themselves by using a data element object type. This data element allows a data object of a particular type to call functional routines that are meant specifically for that type of object. An example would be embedding a media data object (audio file) within a collage image (JPEG, GIF, etc.). After embedding the object, if a store function were to be called on the container object, the container object being an image would invoke a store/save routine that is specific to that image type. Then, as dictated by the object graph store/save routine, the container data object would invoke the store/save function specific to each of its embedded objects iteratively. For example, upon reaching an audio type embedded object, the application would call a save/store routine that is specific to that of an audio data object type and not that of an image type, which is the routine of the container object.

Container and embedded objects reside on the client side component of the database, and the application makes use of our proprietary object graph structure to store the whole object graph using a persistence mechanism as described in U.S. patent application Ser. No. 13/565,171. This provides the application with the flexibility of invoking the specific data object type functionality directly at the client site by using sockets. In this scenario, the object graph saves itself to the file system or as a streaming data store. The application can then act as a streaming server, as opposed to a purely static content server.

A user also has the ability to render functionality individually for each object type as they present themselves in various forms on the client devices. For example, if an audio data object is embedded in an image container object, any authorized user has the ability to play the audio file in the background while viewing or modifying the image. Another example would be the ability of the application to embed a task data object and an audio data object in an email data object—all of which is composed on the server and synced to the client machine using the proprietary object graph structure and sync mechanism described in U.S. patent application Ser. No. 13/565,171.

Figure 6:
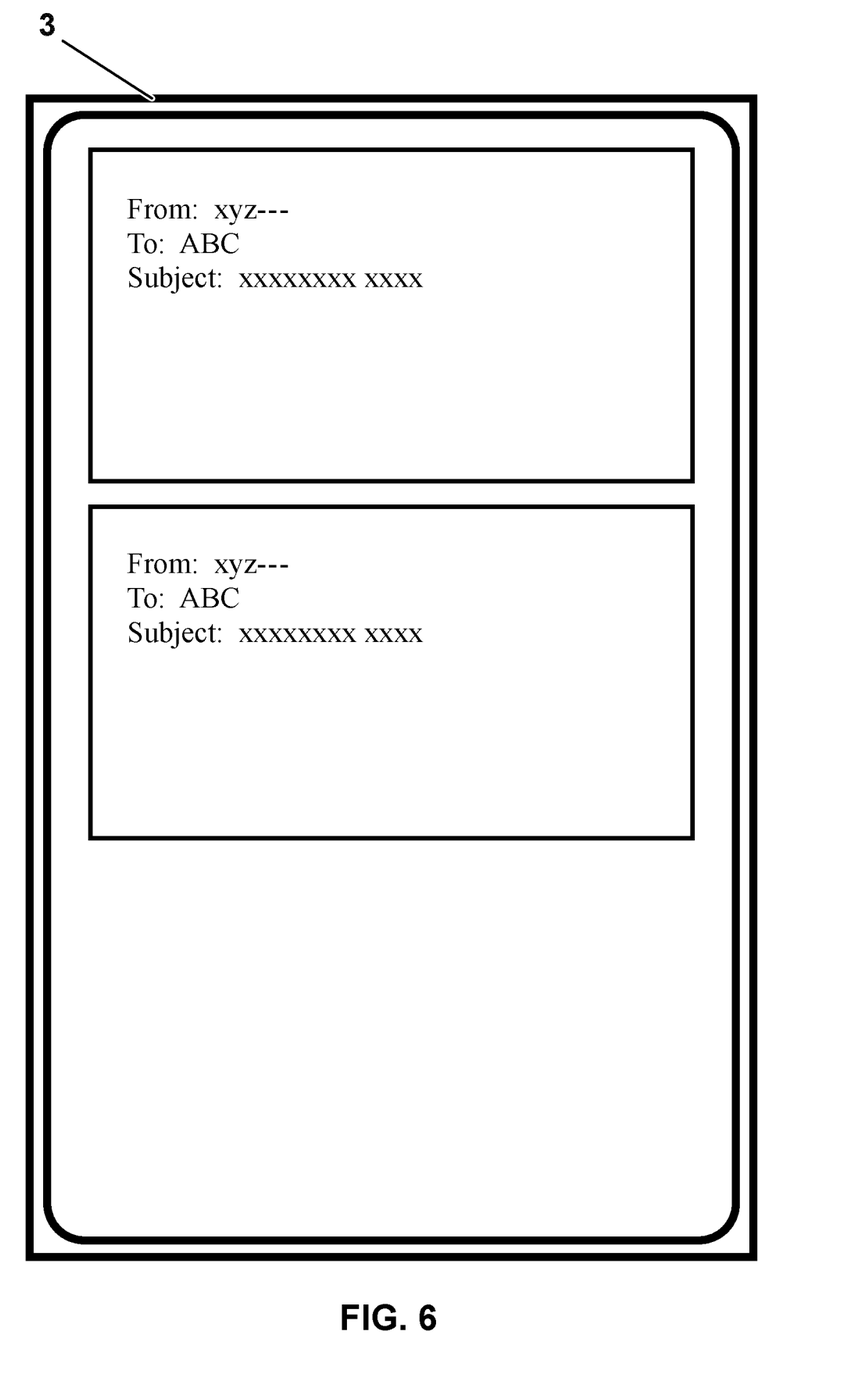
FIG. 6 depicts a streaming interface similar to that of an email client in accordance with an embodiment of the invention.
Figure 7:
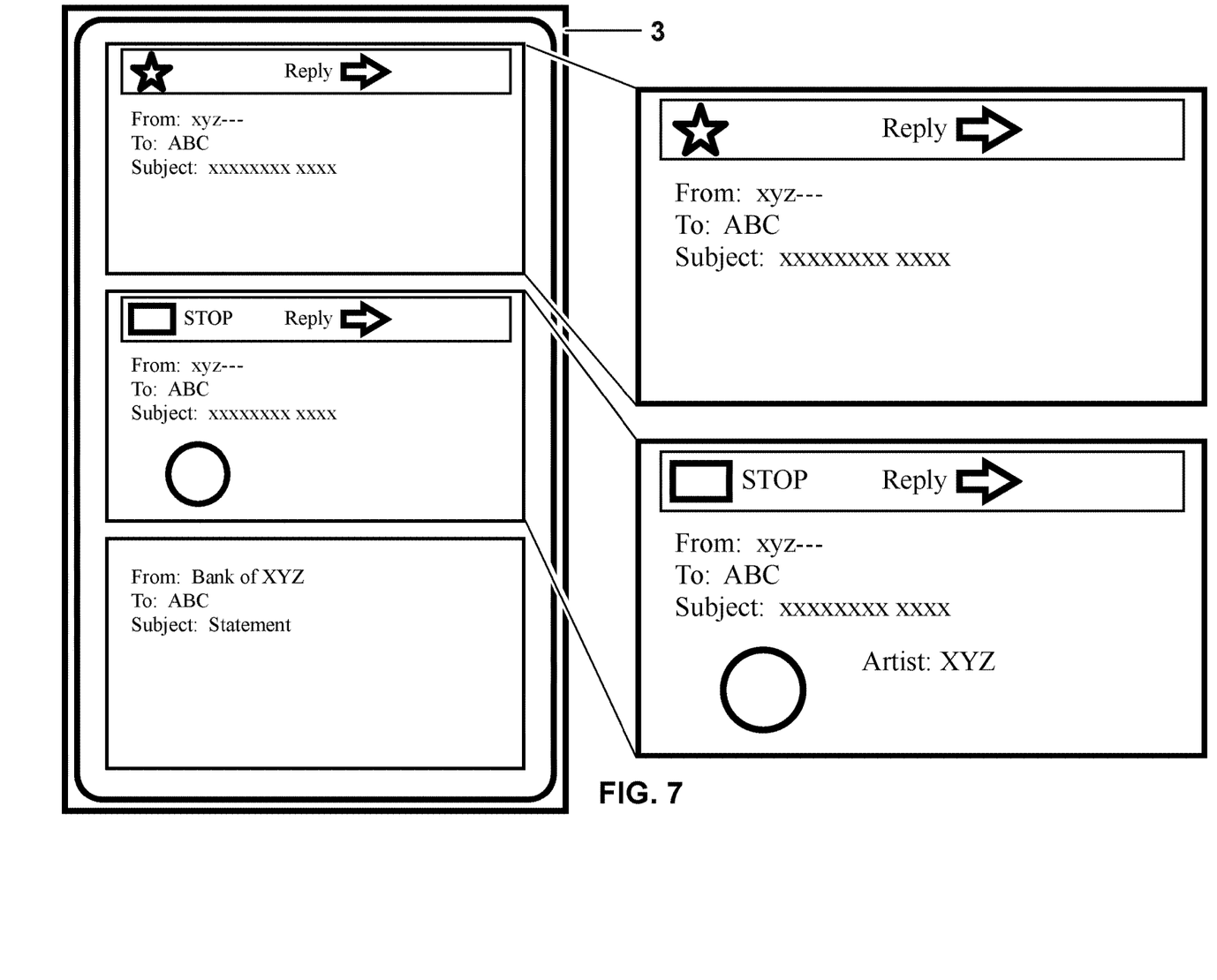
FIG. 7 depicts a streaming interface similar to that of an email client in accordance with an embodiment of the invention.

As the object graph for the streaming container is rendered on the client device as described in PCT US2013/027584, each and every object renders itself in its entirety, and users are able to interact with each of them without having to switch screens or change applications. As illustrated in FIG. 6 and FIG. 7, a streaming interface similar to that of an email client (3) is presented to the user with the first object representing an email object and the next object being an audio track. If the user clicks on the first item, the application would render an email object wherein the user can respond, forward or delete the email message amongst other things. If the user clicks on the audio track object, the application would render itself in an audio player wherein the user can play the track or just save it for later consumption.

Figure 5A:
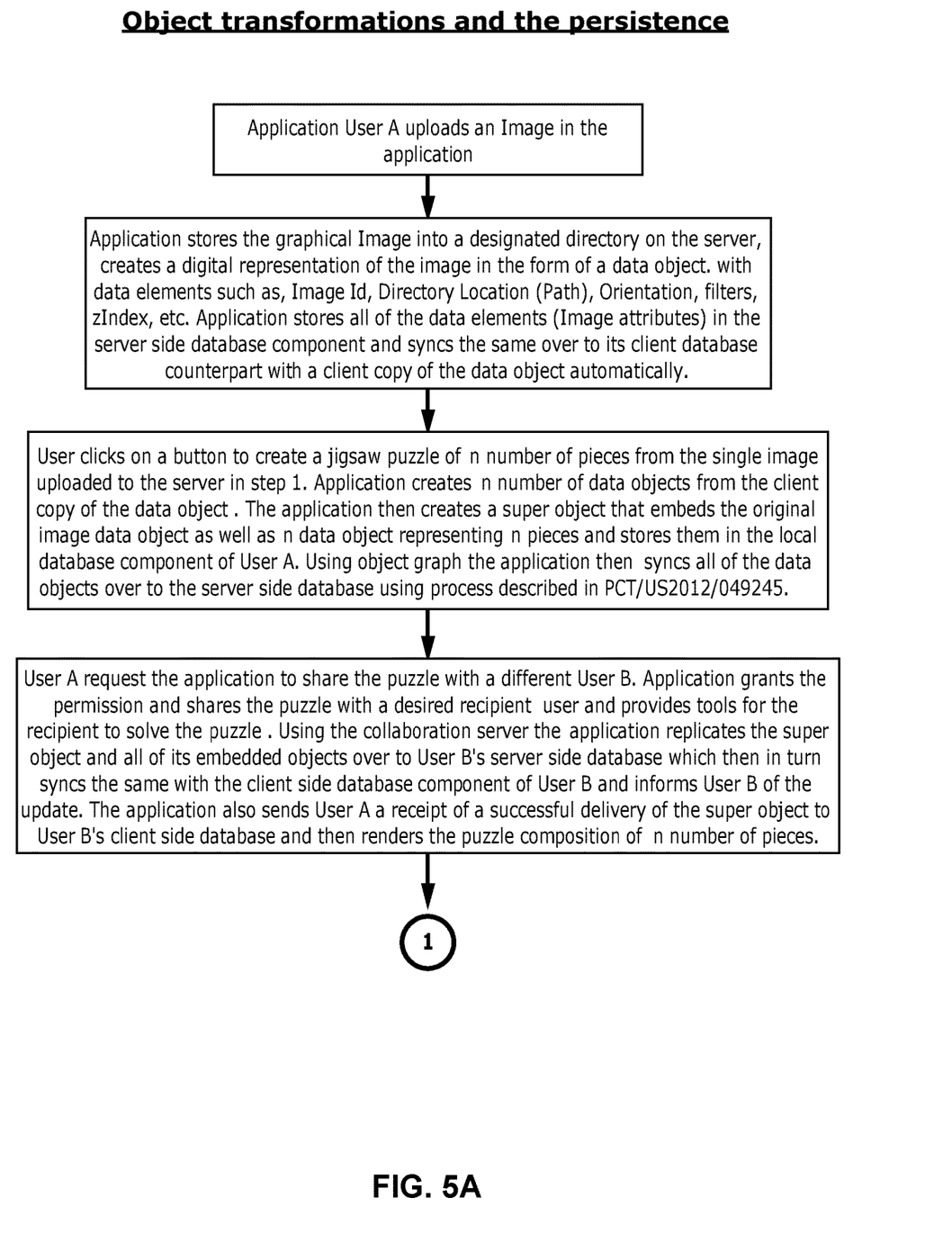
FIG. 5A and FIG. 5B present a diagram of the methodology that illustrates splitting, transformation, mutation and persistence of data object in accordance with an embodiment of the invention.
Figure 5B:
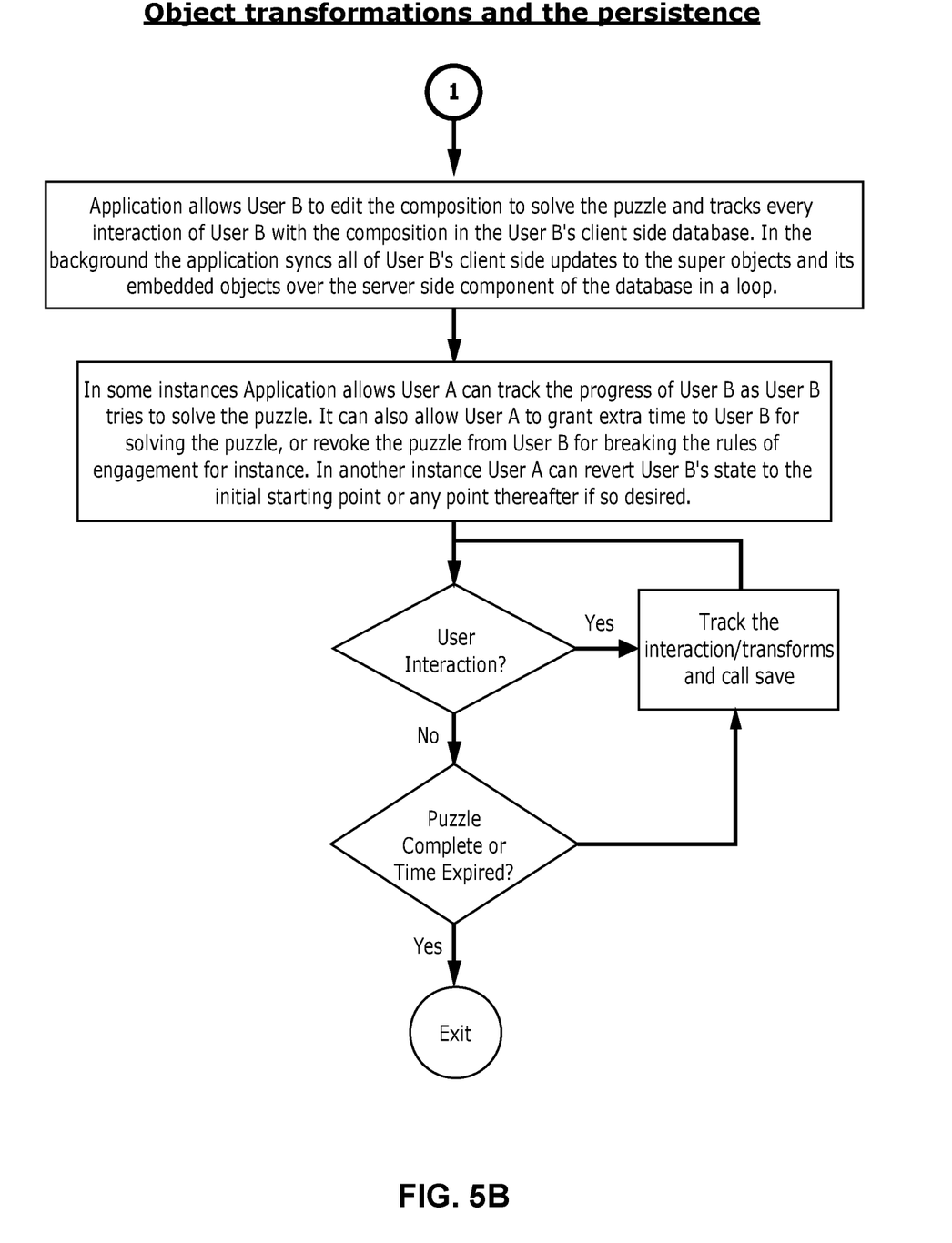

The above functionality has massive implications in the Cloud centric mobile computing world because it eliminates the need for the device owner or the application client to switch from one application to another—in other words, all object functionality is available based on the single rendering. To summarize, the architecture in its totality, as described in U.S. patent application Ser. No. 13/565,171, PCT US2013/027584, PCT US2013/059160, and PCT US2014/28230, allows application developers to write software that can be loaded dynamically at run time without any pre-installation. Further, by using the authentication and permissions servers as described herein, any object of the system can be designated to be a transactional object with an object type data element that can be transacted on in the transaction server. See. FIGS. 5A and 5B.

In addition to the ability to break down a data object into smaller bits (data objects by themselves) and store the same in a Cloud distributed file system, the application may choose to store the actual graphical shape, such as an image, photo, etc., directly on the Cloud distributed file system. For an efficient and smooth end-user experience, our application automatically creates directories on the distributed file system on an "as needed" basis. Further, the application creates a new data element—the "location-path" in each of the newly created data objects. This "location-path" provides a quick access path to the embedded graphical object that may or may not be programmatically created on the canvas element but is saved on the Cloud distributed file system. For a rich user experience, the application needs to provide the ability to navigate with almost zero latency a newly created folder structure on a Cloud distributed file system or any sandboxed local file system. Such a true file system navigation system that maps the Cloud distributed file system in browser with a rich user experience does not exist today.

To truly provide a rich user experience that makes heavy use of graphical shapes, a user needs to be able to seamlessly access his/her collection of all kinds of media. Making use of graphical object creations and manipulations as explained in PCT US2013/027584 and PCT US2013/059160, this application provides an advanced hierarchical tree structure displayed on a Canvas element as described in HTML5, or on any other graphical rendering interface. The tree structure allows for easy navigation of the Cloud distributed file system. This tree structure is created by first mapping the directory structure for a given user into a data object that gets stored on the database component of the user in our proprietary database as described in U.S. patent application Ser. No. 13/565,171. These are simple data objects that represent either a directory or a document. Once the objects are mapped into the database table, the application creates a hierarchical object graph of the entire directory structure in the server side database. The entire object graph, beginning at the directory level, is then synced with the user's client side component.

As described in PCT US2013/027584, by making use of graphical routines to represent data objects residing in the client-side database component, the present application creates a fully functional hierarchical tree structure that supports the expanding and collapsing of nodes, the dragging and dropping of nodes, and the creating of new nodes, amongst other things. Creating new nodes on the client interface corresponds to the creation of an object in the client database, which gets synced with the server side database component of the user's database using the persistence mechanism described in U.S. Patent Application Ser. No. 13/565,171. Graphically, in this case, creating a new node corresponds to the creation of a new folder or a new document on the server side. So, upon syncing the data on to the user's server side database component, the application creates a new folder—a folder that corresponds to the new node in the database—in the Cloud distributed file system. Users have the ability to delete, rename, or move folders in the file system directly from the browser.

As described in PCT US2013/059160, in a given household or in an office setup there could be multiple mobile and stationary networked devices, such as a simple networked drive or a media server. Pursuant to the mechanism described in U.S. patent application Ser. No. 13/565,171, all of these devices can be treated as client devices with the Cloud distributed file system or the structured relational database or the unstructured Cloud distributed database acting as its synching counterpart. Designating each device's storage unit as a container object with its whole file structure being regarded as an embedded object graph, our application allows the above described file system to act as a single navigator in various modes. These modes include, but are not limited to, per device storage navigator, consolidated navigator, sync navigator, etc. Further, the shared documents in the file system can be categorized by contacts, using the graphical shape drawing routines described in PCT US2013/027584.

Embodiments of the invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, or the like, or a combination of two or more thereof.

Embodiments of the invention may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

An embodiment of the invention may be web-based. For example, a server may operate a web application to allow the invention to operate in conjunction with a database. The web application may be hosted in a browser-controlled environment (e.g., a Java applet or the like), coded in a browser-supported language (e.g., JavaScript combined with a browser-rendered markup language (e.g., Hyper Text Markup Language (HTML) or the like)) or the like such that any computer running a common web browser (e.g., Internet Explorer®, Firefox®, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

An embodiment of the invention may be implemented in any type of mobile smartphones that are operated by any type of advanced mobile data processing and communication operating system, such as, e.g., an Apple® iOS™ operating system, a Google® Android® operating system, a RIM® BlackBerry® operating system, a Nokia® operating system, a Microsoft® Windows Mobile™ operating system, a Microsoft® Windows Phone™ operating system, a Linux® operating system or the like.

Further in accordance with various embodiments of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

The invention claimed is:

1. A system for transformation and persistence of all states of a data object during a transformation lifecycle of the data object from an original data object to a transformed data object, comprising:
   a computing device;
   a display connected to the computing device;
   a browser accessible by the computing device;
   a backend server connected to the browser; and
   an application executable on the computing device;
   wherein the browser is configured to receive and create the data object, interpret object types, and hand over the data object to the application;
   wherein the application is configured to interact and transform the data object, create data elements in each data object, separate between various types of data elements of the data object, disassemble and automatically retain original and transformed data elements of the data object to retain an ability to restore any state of the data object during the transformation lifecycle, wherein the data elements constitute attributes of each data object, wherein the attributes comprise at least object ID, directory location, orientation, and filters,
   wherein the data elements comprise a functional data element, a self-timer data element, and an object type data element;
   wherein the application renders functionality individually for each object type via the functional data element on the computing device;
   wherein the object type data element allows the data object of a particular type to call functional routines that are meant specifically for that type of object; and
   wherein the backend server is configured to receive, persist or distribute the data elements of each data object.

2. The system of claim 1, wherein the browser facilitates receipt, by the backend server from the browser, of the original data object via a drag and drop method or choosing the original data object from a file system listing dialog box.

3. The system of claim 1, wherein the application is configured to maintain a built-in intelligent routine that separates between various types of the data elements.

4. The system of claim 1, wherein the application is configured to embed data objects of different types inside one another.

5. A process for transforming and persisting all states of a data object during a transformation lifecycle of the data object from an original data object to a transformed data object in a system comprising a computing device, a display connected to the computing device, a browser accessible by the computing device, a backend server connected to the browser, and an application executable on the computing device, the processing comprising:
   via the browser, receiving and creating the data object, interpreting object types, and handing over the data object to the application;
   via the application, interacting and transforming the data object, creating data elements in each data object, separating between various types of the data elements of the data object, disassembling and automatically retaining original and transformed data elements of the data object to retain an ability to restore any state of the data object during the transformation lifecycle, wherein the data elements constitute attributes of each data object, wherein the attributes comprise at least object ID, directory location, orientation, and filters; and
   wherein the data elements comprise a functional data element, a self-timer data element, and an object type data element;
   via the application, rendering functionality individually for each object type via the functional data element on the computing device;
   via the object type data element, allowing the data object of a particular type to call functional routines that are meant specifically for that type of object; and
   via the backend server, receiving, persisting or distributing the data elements of each data object.

6. The process of claim 5, wherein receiving an original data object via the browser to the backend server includes at least one of:
   using a drag and drop method; or
   choosing from a file system listing dialog box.

7. The process of claim 5, wherein separating between various types of the functional data elements via the application to maintain a built-in intelligent routine.

8. The process of claim 5, further comprising embedding data objects of different types inside one another via the application.

* * * * *